United States Patent
Ambartsoumian

(10) Patent No.: US 12,209,212 B1
(45) Date of Patent: Jan. 28, 2025

(54) TRANSPARENT ADHESIVE LABEL

(71) Applicant: Gourgen Ambartsoumian, Laval (CA)

(72) Inventor: Gourgen Ambartsoumian, Laval (CA)

( * ) Notice: Subject to any disclaimer, the term of this patent is extended or adjusted under 35 U.S.C. 154(b) by 358 days.

(21) Appl. No.: 17/554,117

(22) Filed: Dec. 17, 2021

Related U.S. Application Data

(60) Provisional application No. 63/127,502, filed on Dec. 18, 2020.

(51) Int. Cl.
| | |
|---|---|
| C09J 7/40 | (2018.01) |
| C09D 11/50 | (2014.01) |
| C09J 7/20 | (2018.01) |

(52) U.S. Cl.
CPC .............. C09J 7/403 (2018.01); C09D 11/50 (2013.01); C09J 7/203 (2018.01); *C09J 2203/334* (2013.01); *C09J 2301/18* (2020.08)

(58) Field of Classification Search
None
See application file for complete search history.

(56) References Cited

U.S. PATENT DOCUMENTS

| | | | | |
|---|---|---|---|---|
| 4,375,189 A | * | 3/1983 | Berner | B41K 3/44 101/288 |
| 2019/0256745 A1 | * | 8/2019 | Goubard | C08L 101/00 |

FOREIGN PATENT DOCUMENTS

| | | | |
|---|---|---|---|
| JP | 3941106 B2 | * | 7/2007 |

OTHER PUBLICATIONS

JP 3941106 B2 English translation (Year: 2017).*

* cited by examiner

*Primary Examiner* — Jeffrey D Washville
(74) *Attorney, Agent, or Firm* — NORTON ROSE FULBRIGHT CANADA LLP

(57) ABSTRACT

An adhesive label may include a facestock having at least a see-through portion. An adhesive layer may be on a first surface of the facestock. A support liner is releasably connected to the facestock via the adhesive layer, the support liner having at least a see-through portion aligned with the see-through portion of the facestock, the see-through portion of the support liner defining an ink receiving surface facing away from the facestock; A slit(s) is defined in the support liner to separate the support liner in at least two parts, with a first of the at least two parts being removable to expose the adhesive layer while a second of the at least two parts remains adhered to the facestock so as to have data inscribed on the ink receiving surface.

18 Claims, 6 Drawing Sheets

TRANSPARENT ADHESIVE LABEL

CROSS-REFERENCE TO RELATED APPLICATION

The present application claims the priority of U.S. Patent Application No. 63/127,502, filed on Dec. 18, 2020, and incorporated herein by reference.

TECHNICAL FIELD

The present application relates to transparent labels such as transparent labels used in a printer, in a roll, in a sheet, etc.

BACKGROUND OF THE INVENTION

Transparent adhesive labels are commonly used and appreciated, notably for their discretion due to their transparency. However, due to exposure of the ink on the surface of their polymeric body, transparent adhesive labels may not always be apt in keeping ink thereon as secure as it may be necessary. A number of factors such as exposure to chemicals, friction, physical contact, environmental conditions may damage the ink and cause a loss of printed or inscribed information. It would be desirable to configure transparent adhesive labels to protect data inscribed thereon.

SUMMARY OF THE INVENTION

It is an aim of the present disclosure to provide a transparent adhesive label that addresses issues related to the prior art.

In accordance with a first aspect, there is provided an adhesive label comprising: a facestock having at least a see-through portion; an adhesive layer on a first surface of the facestock; and a support liner releasably connected to the facestock via the adhesive layer, the support liner having at least a see-through portion aligned with the see-through portion of the facestock, the see-through portion of the support liner defining an ink receiving surface facing away from the facestock; wherein at least one slit is defined in the support liner to separate the support liner in at least two parts, with a first of the at least two parts being removable to expose the adhesive layer while a second of the at least two parts remains adhered to the facestock so as to have data inscribed on the ink receiving surface.

Further in accordance with the first aspect, for example, the facestock is entirely transparent.

Still further in accordance with the first aspect, for example, the support liner is entirely transparent.

Still further in accordance with the first aspect, for example, the support liner includes a thermochromic ink system.

Still further in accordance with the first aspect, for example, a second support liner may be provided, a second surface of the facestock being releasably adhered to the second support liner.

Still further in accordance with the first aspect, for example, a static cling connection may be between the second support liner and the second surface of the facestock.

Still further in accordance with the first aspect, for example, a plurality of the adhesive label are on the second support liner.

Still further in accordance with the first aspect, for example, tear perforations are defined in the second support liner.

Still further in accordance with the first aspect, for example, tear perforations are defined in the facestock and support liner to segment the facestock and support liner in at least two of the adhesive label.

Still further in accordance with the first aspect, for example, printer sensor markers are provided on the second support liner.

Still further in accordance with the first aspect, for example, mirror-image printing may be on the ink receiving surface of the support liner.

Still further in accordance with the first aspect, for example, the first of the at least two parts entirely surrounds the second of the at least two parts, wherein the second of the at least two parts is surrounded by adhesive of the adhesive layer when the first of the at least two parts is removed.

Still further in accordance with the first aspect, for example, the adhesive label extends in a longitudinal direction, and wherein two of the slits are defined in the support liner to separate the support liner in three parts parallel to one another.

Still further in accordance with the first aspect, for example, a second support liner may be provided, a second surface of the facestock being releasably adhered to the second support liner.

Still further in accordance with the first aspect, for example, printer sensor markers are provided on the second support liner.

Still further in accordance with the first aspect, for example, printer sensor markers are provided on the support liner or on the facestock.

Still further in accordance with the first aspect, for example, tear perforations are defined in the facestock to segment the facestock in at least two of the adhesive label, the tear perforations being transverse to the longitudinal direction.

Still further in accordance with the first aspect, for example, printer sensor markers are provided on the support liner.

Still further in accordance with the first aspect, for example, printer sensor markers are provided on the facestock.

In accordance with a second aspect of the present disclosure, there is provided a method for using an adhesive label comprising: removing part of a support liner adhered to a facestock having at least a see-through portion, to expose an adhesive on a first surface of the facestock, another part of the support liner being see-through having data thereon, the other part remaining connected to the first surface of the facestock via the adhesive; and applying the first surface of the facestock to a surface such that the facestock adheres to the surface by the adhesive exposed by the removing; whereby the data on the support liner is visible through the facestock.

Further in accordance with the second aspect, for example, removing the part of the support liner includes removing the part entirely surrounding the other part.

Still further in accordance with the second aspect, for example, printing the data on the support liner may be performed prior to the removing.

Still further in accordance with the second aspect, for example, the printing includes mirror-image printing.

Still further in accordance with the second aspect, for example, the facestock may be removed from another support liner, a second surface of the facestock adhered to the other support liner.

Still further in accordance with the second aspect, for example, removing the facestock from the other support liner including peeling the facestock from a static cling engagement with the other support liner.

Still further in accordance with the second aspect, for example, there may be performed tearing a portion of the other support liner from a remainder of the other support liner via perforation lines in the other support liner.

Still further in accordance with the second aspect, for example, the applying includes applying the label to a container for cryogenic storage at around −80C or below.

Still further in accordance with the second aspect, for example, the applying includes applying the label to a surface that comes in contact with one of more of: chemical(s), solvent(s), cleaning agent(s), disinfectant, oil, grease, fuel, detergent, gel, dirt, paint, ink, bodily fluid(s), water, snow, freezing, frost, soil, adverse environmental conditions, liquefied gas.

Still further in accordance with the second aspect, for example, there may be performed a step of providing to an end user a container pre-labelled with the adhesive label after the applying.

Still further in accordance with the second aspect, for example, there may be performed a step of exposing the adhesive label to any step of sterilization.

The layers and other components of the label and label material shown in the figures are for the purpose of visualizing the concept and may not necessarily be proportional to actual label sizes and label material construction.

BRIEF DESCRIPTION OF THE EMBODIMENTS

Figure 1A:
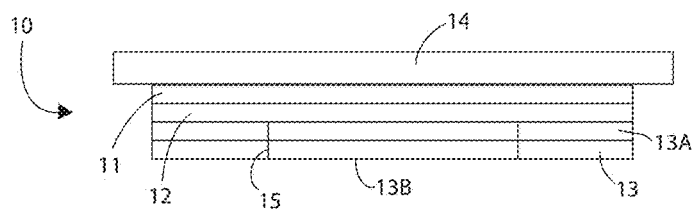
FIG. 1A is a schematic elevation view of a transparent adhesive label in accordance with an aspect of the present disclosure.

Referring to the drawings and more particularly to FIG. 1A, a transparent adhesive label in accordance with a variant of the present disclosure is generally shown at 10. The transparent adhesive label 10 may have various layers, as described below. The expression transparent is used as one can see through the label 10, but transparent may include some level of haziness, translucency, as translucent materials have a level of transparency. Any level of haziness, transparency or translucency is contemplated.

The facestock 11 is the main layer of the transparent adhesive label 10, in that it its periphery defines the footprint of the transparent adhesive label 10. In use, the facestock 11 is the exposed layer of the transparent adhesive label 10. The facestock 11 may include one or more layers, including transparent (a.k.a., clear) or translucent layers, top coatings, inks, ink-receptive coatings, varnishes, laminations, another layer of a facestock, etc. The facestock 11 may be any type of polymer based material such as any variation of a thermoplastic film including but not limited to polyvinyl, polyethylene terephthalate a.k.a. polyester (PET), polypropylene (PP), biaxially oriented polypropylene (BOPP), polyethylene (PE), polyolefin, polystyrene, nylon, satin, acrylate or acrylate based films, silicon rubber or any combination thereof, or any type of composite material. Also, the facestock 11 may be a thermoset material. The facestock may be coated with any type of coating(s), top coating(s), varnishes, ink-receptive coatings or inks which for example may be water based, solvent based, emulsion based or any combination thereof. The coatings may be curable or cross-linkable using methods involving any appropriate wavelength of rays or radiation such as ultra-violet rays (UV), Ultraviolet Light-emitting Diode (LED UV), Electron Beam curing (EBC), Infrared rays (IR), etc. The facestock 11 and/or support liner 13 described below may also include additional layer(s) such as a lamination.

An adhesive layer 12 is coated on a surface of the facestock 11. The adhesive of the layer 12 may include but is not limited to water-based, emulsion-based, solvent-based, hot-melt, UV-hotmelt, rubber-based, silicon-based, latex based, UV-curable, LED UV curable, or any other type of adhesive appropriate for coating on the facestock or any combination thereof. Types of adhesives also can be permanent, removable, repositionable, or any levels or degree of permanency, removability or repositionability. The adhesive 12 may also be configured for being adhered to frozen containers such as vials at surface temperature around-72C or below, with such adhesive being known and available commercially as CryoSTUCK®.

A support liner 13, also known as a release, a release liner, a backing or a liner, is also provided, from which the adhesive 12 with the facestock 11 can be released. For example, the support liner 13 may include a release coating 13A, such as a silicon coating, a fluorosilicone coating or a non-silicone based coating on which the adhesive 12 is harboured. The support liner 13 may also be transparent, and may receive ink thereon, such as on surface 13B thereof. The ink receiving surface may be printed with any type of ink, and data that is printed may be text, barcode including 1-dimensional barcode (a.k.a. linear barcode), 2-dimensional barcode, 3-dimensional barcode, QR code, serialized barcode, serialized number, serialized barcode with human readable information, randomized data, randomized barcode, image, graphic, logo, alphanumeric indicia, variable or non-variable information, inscribed information including written or hand-written information and/or color, commonly referred to herein as data. Printing may be added by the manufacturer, and/or the end user. Surface 13B, facing away from the facestock 11, may be said to be without adhesive, or adhesive free. Accordingly, while the expression support liner 13 is used, notably because part of the support liner 13 is removed to expose the adhesive 12, the support liner 13 may also be referred to as another facestock 11, as it may accept ink, printing, markings thereon. The support liner 13 may be transparent, hazy or translucent, and may include but is not limited to any type of a polymer based material. Such materials may comprise any variation of a thermoplastic film including but not limited to polyvinyl, polyethylene terephthalate a.k.a. polyester (PET), polypropylene (PP), biaxially oriented polypropylene (BOPP), polyethylene (PE), polyolefin, polystyrene, nylon, satin, acrylate or acrylate based films, silicon rubber or any combination thereof, or any type of a composite material, or any transparent polymer film which can accept any type of a release coating or having an intrinsically easy release surface. The support liner 13 may include or may incorporate a thermochromic ink system (such as leuco dye), for example in a layer of coating that is part of the support liner or incorporated in the material of the support liner 13, for the color to be revealed upon heating such as when printing is done in thermal printer. In a variant, the ink of the support liner 13 is a direct thermal printable ink for printing with direct-thermal printers. In a variant, the ink of the support liner 13 is reversible or non-reversible thermochromic ink. The support liner 13 may be printable with any type of printing method including but not limited to thermal, thermal-transfer via using thermal transfer printer (a.k.a., barcode printer commercially available from Zebra®, Datamax®, O'Neil®, CAB®, etc.), laser, inkjet, UV inkjet, LED printing, UV printing, laser etching, digital printing, liquid toner printing, powder toner printing, offset printing, screen printing, impact printing (a.k.a., dot-matrix printing), etc. The support liner 13 may or may not be coated with an ink-receptive coating capable of accepting any type of ink. As shown in FIG. 1, the facestock 11 and the support liner 13 may have the same dimensions, such that the adhesive 12 of the facestock 11 is covered by the support liner 13. The support liner 13 may also be wider or longer than the facestock 11, to extend beyond the periphery of the facestock 11.

Figure 1B:
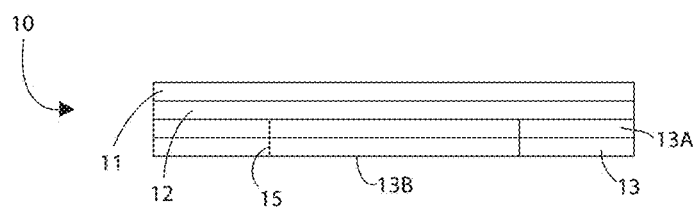
FIG. 1B is a schematic elevation view of a transparent adhesive label in accordance with another aspect of the present disclosure.

Another support liner 14 is provided on the opposite surface of the facestock 11, as in FIG. 1A, but the support liner 14 is optional as shown in FIG. 1B. The other support liner 14 may for example exceed the dimensions of the facestock 11 peripherally, though this is only an option, as for example the other support liner 14 may be of approximately the same size as the facestock 11. The support liner 14 is for instance the substrate that supports a plurality of the transparent adhesive label 10. For example, a plurality of the transparent adhesive labels 10 share a common support liner 14. The support liner 14 may consequently be in the form of a roll or a sheet. In use, the facestock 11 is detached from the support liner 14, with part of the other support liner 13 then removed for the facestock 11 to be adhered to an object via the adhesive 12, as explained below. Therefore, according to one interpretation, the transparent adhesive label 10 may be said to exclude the support liner 14, as the support liner 14 is a substrate for the transparent adhesive labels 10.

In a variant, the support liner 14 is a static cling to which one or more transparent adhesive labels 10 is adhered. As a transparent adhesive label 10 is detached from the static cling 14, neither one of the transparent adhesive label 10 and static cling 14 exposes an adhesive surface, facilitating manipulation by a user. In another variant, the support liner 14 may have an adhesive layer, with the transparent adhesive label 10 having a release coating thereon to be detached from the support liner 14. In another embodiment the support liner 14 is coated with a removable or a repositionable adhesive that can be easily released from the facestock 11. The support liner 14 can be transparent, hazy, translucent, opaque. In a more practical use, the support liner 14 is transparent, to allow a user to see data inscribed on the transparent adhesive label 10, although an opaque version of the support liner 14 is contemplated.

Figure 2:
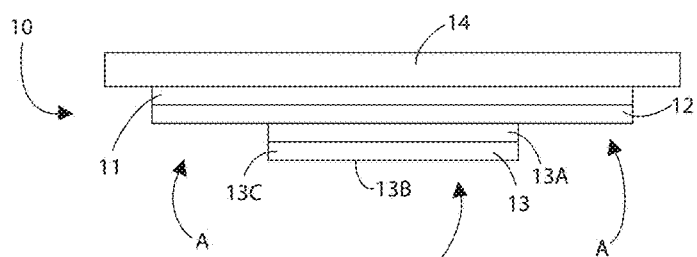
FIG. 2 is a schematic elevation view of the transparent adhesive label of FIG. 1, with part of a support liner removed.

Still referring to FIGS. 1A and 1B, slits 15 are shown as being defined in the support liner 13, including in the release coating 13A although the slits 15 may be in the support liner 13 alone without touching the release coating 13A, as such a configuration may suffice in segmenting the support liner 13. The slits 15 may also be referred to as die-cuts or kiss-cuts, for example because the slits 15 may result from a die-cutting process. The slits 15 are provided for the removal of some part or parts of the support liner 13 from the facestock 11, as shown in FIG. 2, while other part(s) of the support liner 13 remain adhered to the facestock 11. FIG. 2 shows the transparent adhesive label 10 after the removal of part(s) of the support liner 13. Once the support liner 13 is removed, the adhesive layer 12 is exposed at A, while the part of the support liner 13 remaining adhered to the facestock 11 is shown at B. There results the transparent adhesive label 10 that may be adhered to an object via the adhesive exposed at A, with the surface 13B of the support liner 13, having data thereon, is against a surface of the object. The thickness of the support liner 13 is exaggerated in FIG. 2, as the transparent adhesive label 10 of FIG. 2 is generally planar when adhered to a surface.

Figure 3:
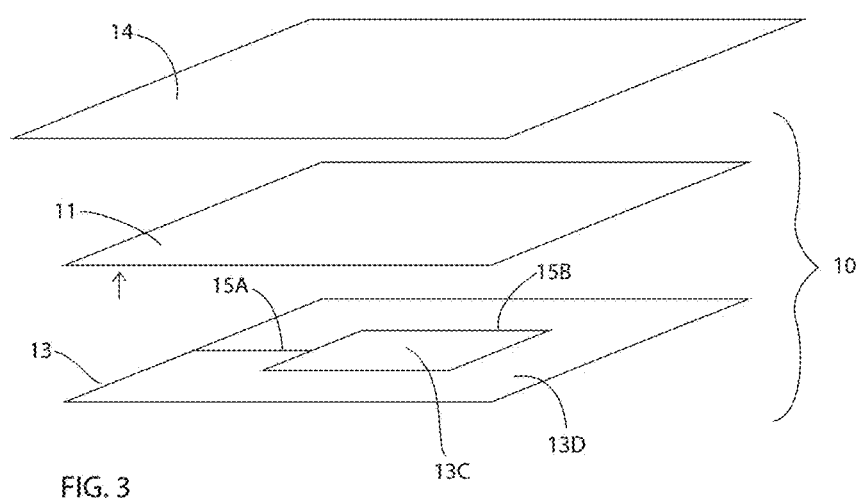
FIG. 3 is a perspective exploded view of the transparent adhesive label of FIG. 1.

Referring to FIG. 3, an embodiment of the transparent adhesive label 10 is shown, with the facestock 11 being rectangular in shape. The shape of the facestock 11 may have other shapes, including square, rectangle, round, oval, triangle, trapezoid, polygonal, to name a few shapes among others or it can be atypical, asymmetric or any combination of shapes. The support liner 13 may have a matching shape, as shown, with a footprint matching that of the facestock 11, for the adhesive 12 to be concealed from exposure by the support liner 13. The slit 15 may have a first segment 15A extending from a periphery of the support liner 13, leading to segments 15B of the slit forming a closed shaped (herein, a rectangle, as an example of an infinite number of possible shapes). As the support liner 13 is pulled off of the facestock 11, the part 13C of the support liner 13 surrounded by the segments 15B remains on the facestock 11, while the rectangular strip 13D of support liner 13 surrounding the part 13C peels off. The manipulation may be facilitated by the presence of the first segment 15A extending to the periphery of the support liner 13, though this segment is optional.

Figure 4A:
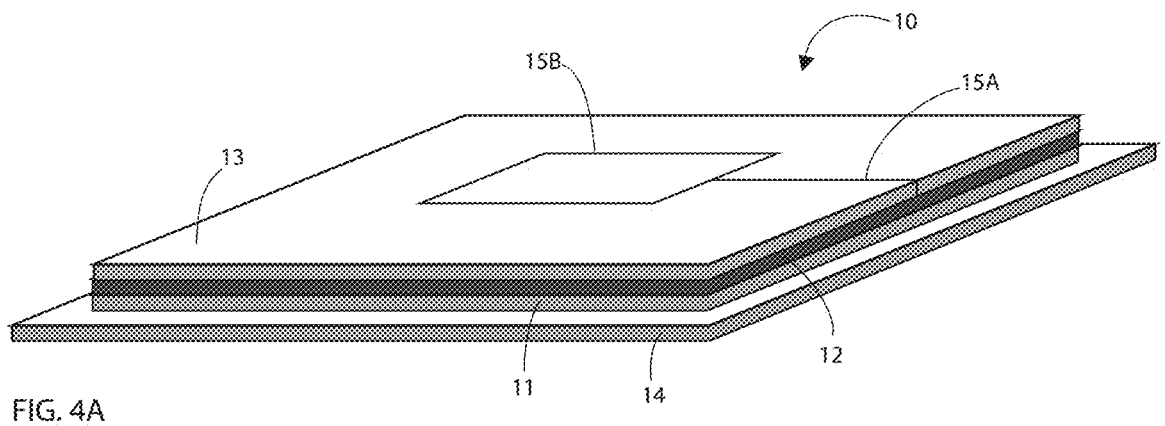
FIGS. 4A to 4C are perspective schematic views of different configuration of the transparent adhesive label of the present disclosure.
Figure 4B:
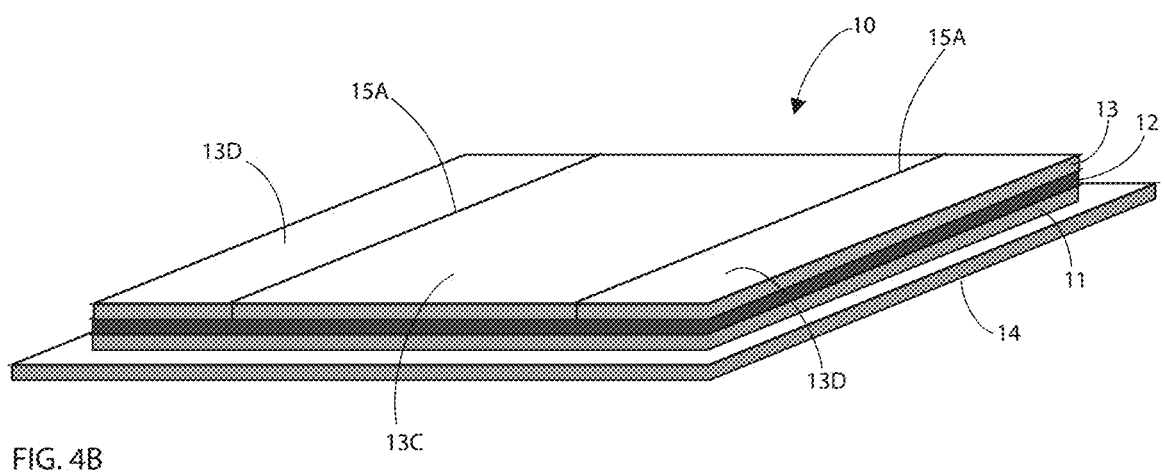
Figure 4C:
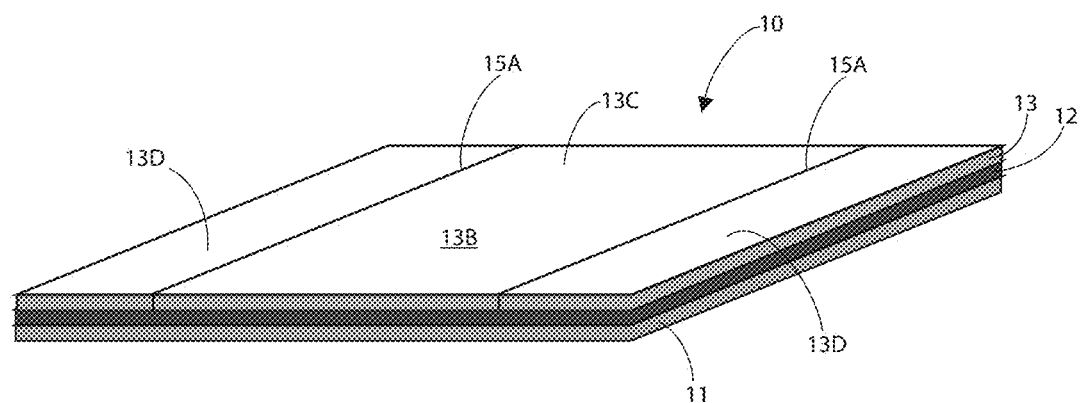
Figure 8A:
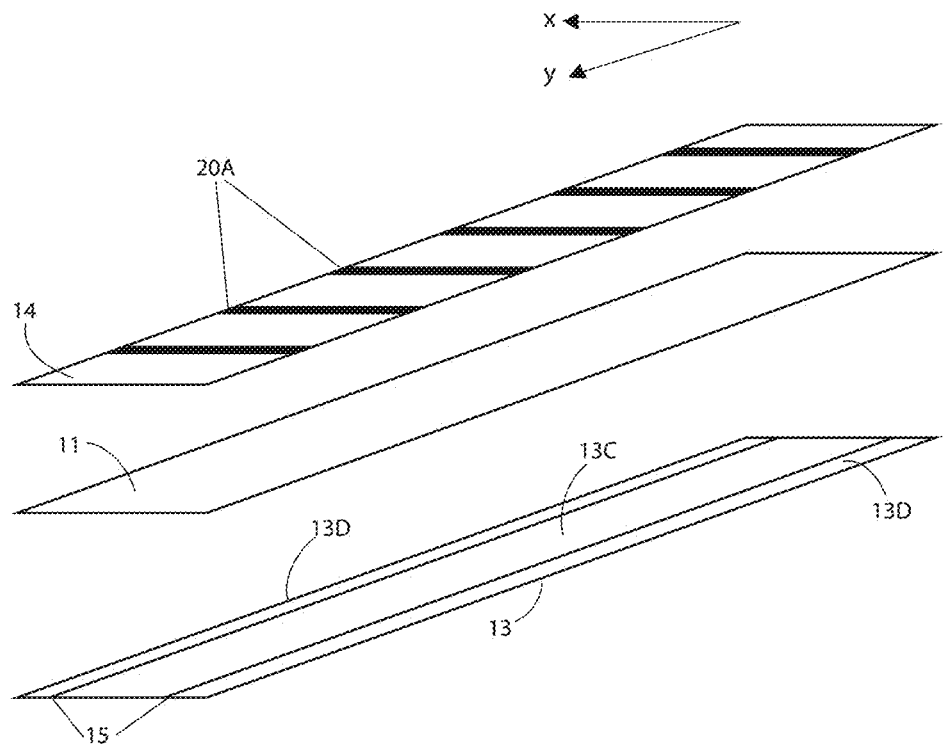
FIG. 8A is an exploded perspective view of a strip of the roll of FIG. 7.

Accordingly, the exposed surface of adhesive, equating to A in FIG. 2, surrounds the part 13C remaining on the facestock 11, equating to B in FIG. 2. The exposed surface of adhesive adheres to the surface of an object, and essentially forms a barrier for part 13C (B in FIG. 2), lying against the surface of the object. Depending on the type of the adhesive and the material selection, that barrier may be resistant to water, liquids, chemicals, solvents, paints, oil, gasoline, gases such as nitrogen, oxygen, liquified gases, vapors, or to any other substances in any physical condition or form. In a variant the barrier formed by the adhesive may also have antimicrobial or antifungal capabilities. However, the part 13C may also extend to the periphery of the facestock 11, as another possibility. For example, different configurations are shown in FIGS. 4A to 4C, with FIG. 4A emulating the configuration of FIG. 3, FIG. 4B having three different sections of support liner 13, any one or more being removable from the facestock 11, with a central one of the three different sections of support liner 13 typically remaining adhered to the facestock 11 while the lateral ones are removed (though other arrangements are possible). Although part 13C with a surface 13B is shown occupying a central position in the label 10, it may be positioned at any other location on the adhesive 12 of the facestock 11 of the label 10. The transparent adhesive label 10 of FIG. 4B may be referred to as an elongated transparent adhesive label 10, suited to be cut in various heights of the transparent adhesive label 10, for example in the strip shown in FIG. 8A. FIG. 4C has the same configuration as in FIG. 4B, but without the support liner 14. The absence of support liner 14 may also be present in the variant of FIG. 4A, or in any other variant. Part 13C, B in FIG. 2, does not adhere to the surface of the object. Part 13C supports data written, printed, marked thereon, whereby such ink is shielded from the surroundings of the object by the facestock 11. As both the facestock 11 and support liner 13 are clear (i.e., transparent, hazy or translucent to some extent), the data on the surface 13B of the part 13C may be seen through the facestock 11 and support liner 13. If the support liner 14 is present, the data can be seen also through support liner 14 if the support liner 14 is transparent, hazy and/or translucent.

Figure 5A:
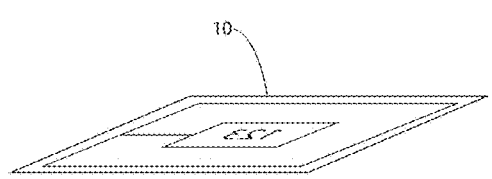
FIG. 5A to 5E are schematic views of a sequence for labelling an object with the transparent adhesive label of FIG. 3.
Figure 5B:
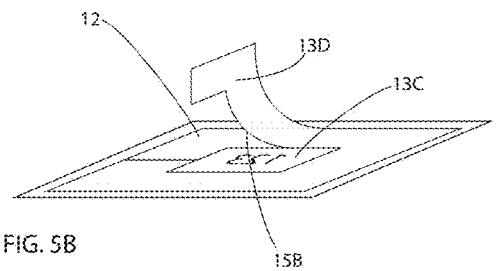
Figure 5C:
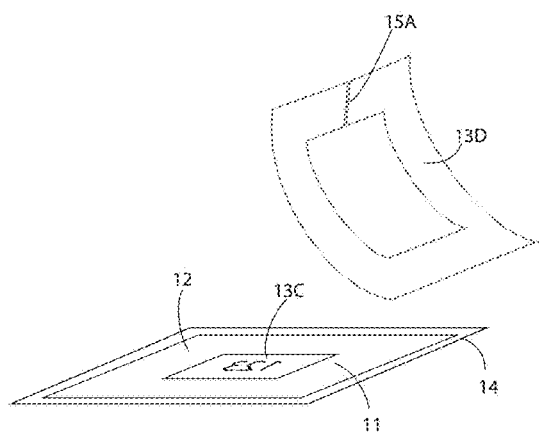
Figure 5D:
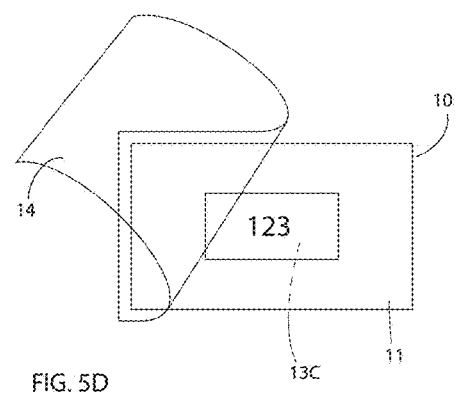
Figure 5E:
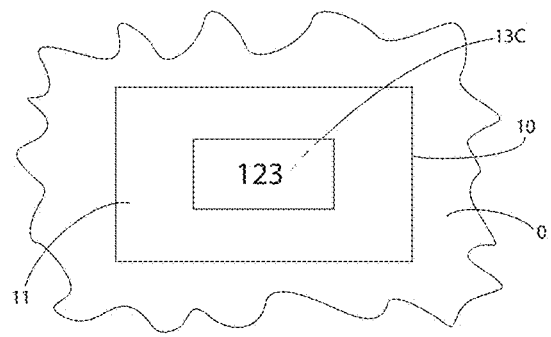

FIGS. 5A to 5E show an exemplary use of the transparent adhesive label 10. In FIG. 5A, the transparent adhesive label 10 has its support liner 13 and is on static cling 14 or other support liner (though optionally). In FIG. 5B, removal of part of the support liner 13 is initiated to expose the adhesive. As shown, the removal of the support liner 13 may be facilitated if initiated at the segment 15A. In FIG. 5C, the support liner 13 is completely detached, for the adhesive 12 to be exposed, while the part 13C of the support liner 13 remains on the facestock 11. The static cling 14 may be removed, though the removal may also be done at any other time depending on the application, such as before the step of FIG. 5B for example, or after the step of FIG. 5E. In a variant, the other transparent liner 14 may be left in place and may never be removed, so as to serve as an extra shielding layer. In FIG. 5E, the transparent adhesive label 10 is adhered to the surface of the object O, with the data, shown as 123, being visible through the facestock 11 and the support liner 13. As can be observed in FIGS. 5A-5C, when printing the data of the surface 13B (FIG. 2) of part 13C of the support liner 13, the inscription may be printed as a mirror image of what a user wants to display. As the surface 13B of the part 13C faces the object and the data is seen through the facestock 11 and the support liner 13, mirror-image printing may be required for the data to appear in the desired orientation as in FIG. 5E.

Figure 6:
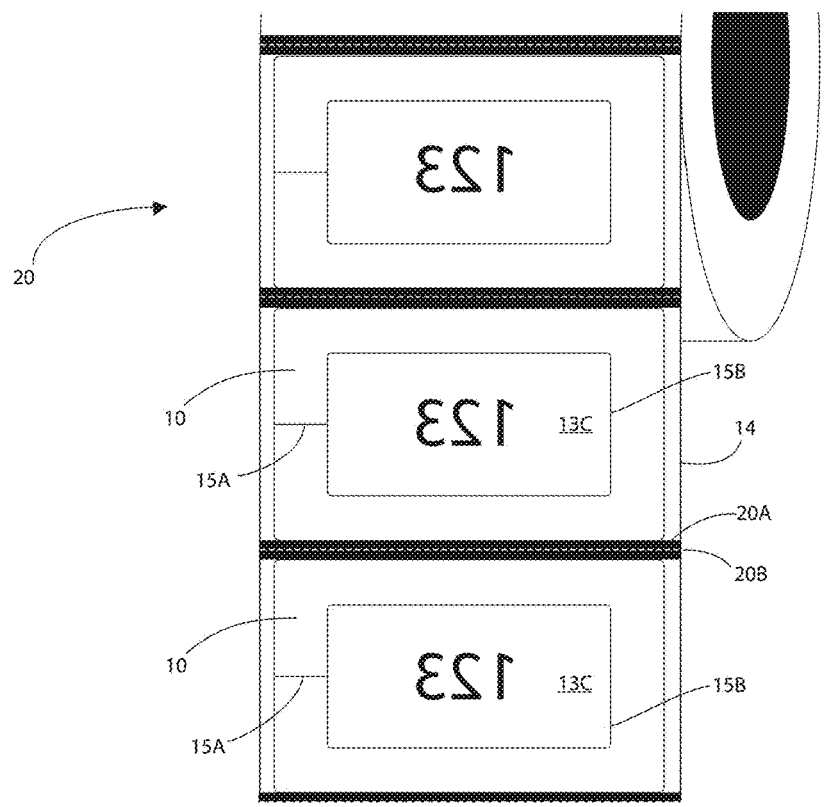
FIG. 6 is a perspective view of a roll having a plurality of the transparent adhesive label of FIG. 3.
Figure 7:
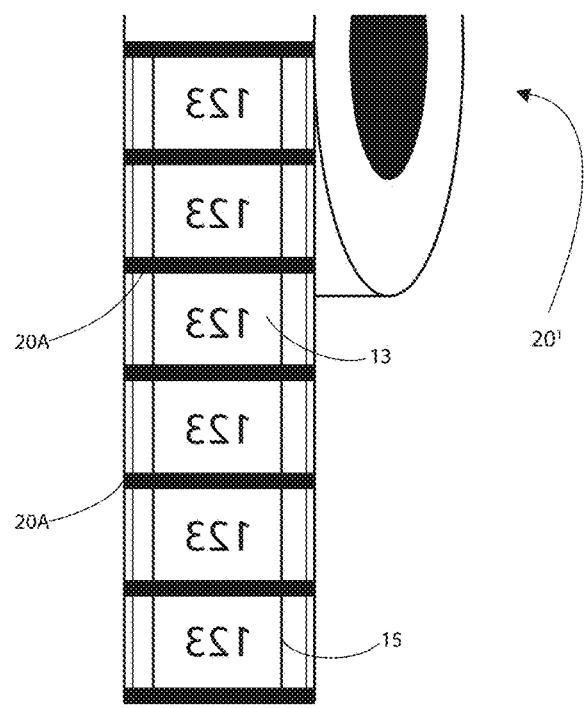
FIG. 7 is a perspective view of a roll having an elongated transparent adhesive label in accordance with a variant of FIG. 4B.

Referring to FIG. 6, a plurality of transparent adhesive labels 10 are provided on a roll 20 of static cling 14, or other support liner 14. In an embodiment, the roll 20 is configured for use with a printer. Therefore, marking 20A (a.k.a., label position indicators) may be provided on the static cling 14, on the support liner 13, and/or on the facestock 11 to serve as a marker for a sensor of a printer (e.g., optical or visual sensor), for the printer to determine the position of the transparent adhesive labels 10 based on a distance from marking 20A. In an embodiment, the marking 20A is made of a contrasting color (e.g., black), but other types of markings 20A may be used as well. Moreover, perforations lines 20B may be present, aligned or not with the markings 20A, to tear off a portion of the static cling 14 with a transparent adhesive label 10 thereon from the roll 20, or from a strip of the static cling 14. As an embodiment, notches, e.g., cut through areas in the support liner, may be the marking 20A used for the printer sensor detection of the label position.

Figure 8B:
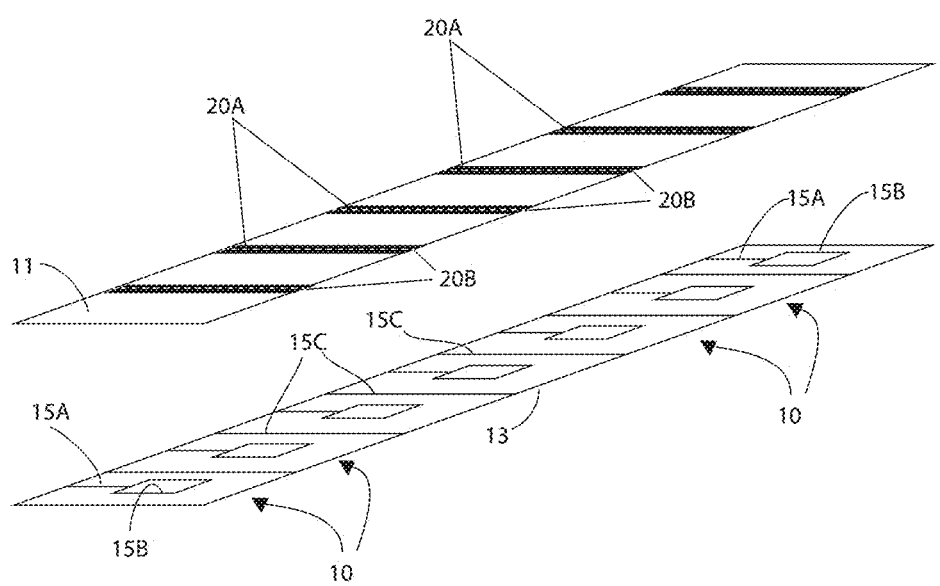
FIG. 8B is an exploded perspective view of a strip of the labels of FIG. 1B.
Figure 8C:
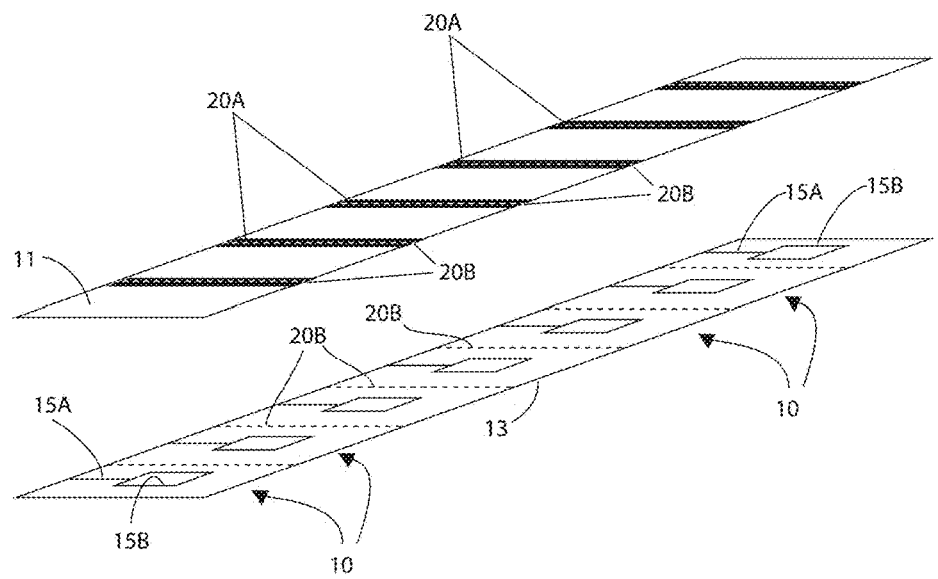
FIG. 8C is an exploded perspective view of a strip of the labels of FIG. 1B.
Figure 9:
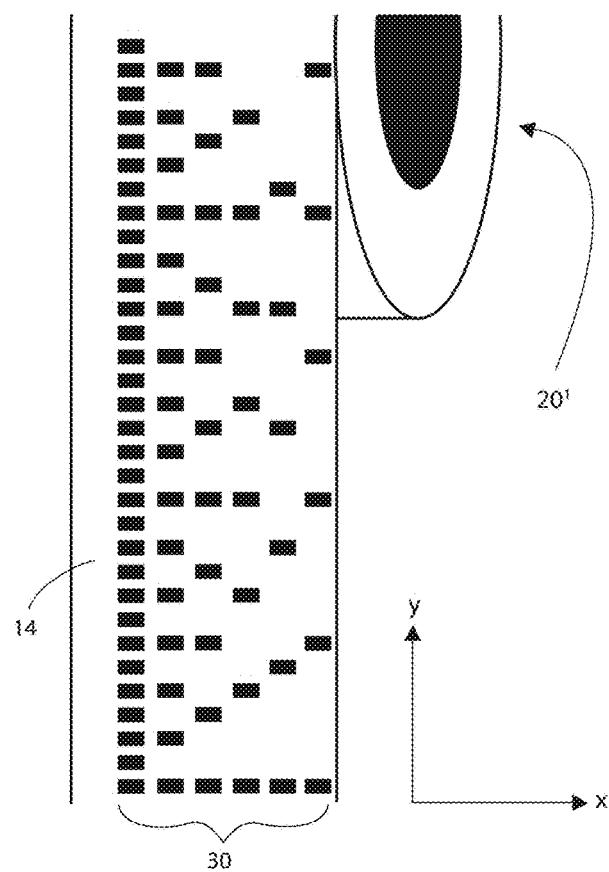
FIG. 9 is a schematic face view of the other support liner such as a static cling of the elongated transparent adhesive label of FIG. 6 or FIG. 8A, for example.

Perforations lines 20B may be a series of punctures or weakness(es) in the material of the facestock 11 and support liner 13, as in FIG. 8C for example, and as an option in static cling 14. FIGS. 7, 8A, 8B, 8C and 9 respectively show another roll 20', and construction of transparent adhesive label 10 on static cling 14, for the variant of FIG. 4B. Like reference numerals show like elements in FIGS. 6, 7 and 8A-C. The roll 20' may not have perforations lines 20B as does the roll 20 of FIG. 6. The roll 20' is for example of the type used to define labels of different heights (i.e., in the lengthwise direction of the strip as shown along the Y axis in FIG. 8A). In the embodiment in which the facestock 11 is without the support liner 14 as in FIGS. 1B and 1n FIG. 8B and in FIG. 8C, the facestock 11 may be in a continuous form with the support liner 13 which will have die-cuts 15A and 15B similar to the one shown in FIG. 6. In such a case, the labels 10 can be separated through perforation lines 20B penetrating both the facestock 11 and the support liner 13 (FIG. 8C). Alternatively, die-cuts 15C may be present in the support liner 13 (FIG. 8B). The user may segment each label 10 by separating it through the perforation line 20B (and potentially the die-cut 15C), then remove the portion of the support liner via the slit 15A and subsequently apply the label 10 to a substrate by adhesion of the adhesive 12 of the facestock 11. In the embodiment of FIG. 8B or FIG. 8C, marking 20A may be on the facestock 11 as shown, or on the support liner 13. Referring to FIG. 9, a mosaic of discrete marks 30 is shown, the discrete marks 30 being on the static cling. The discrete marks 30 are used with a sensor of a printer such as mark sensor, with the transparent adhesive label 10 of the roll 20' of FIGS. 7 and 8A or 8B. The sensor may be aligned with the appropriate column of the discrete marks 30, each column being representative of a given label height. This may entail that the sensor is displaced along axis X to be in alignment with the appropriate column. The sensor may guide the printer where to print and, if the printer has a cutter, the sensor may guide the cutter knife on where to perform a cut. One or more than one of the black-marked columns shown in FIG. 9 can be used depending the end-user application. In a particular configuration, the marks 20A on the liner 14 in FIGS. 8A,8B may be absent and the printer can print in a continuous mode to produce a continuous tape with indicia printed continuously on 13C, in any appropriate length. As yet another embodiment. the marks 20A in FIGS. 8A,8B may be present and serve as printing indicia at specific intervals on a continuous tape from which the portions 13D can be removed. There may result a printed tape that may then be applied to an object, to a surface. The tape configuration of FIG. 8A may have some tear-cuts or slits on at least on one edge or on both side edges as described in the U.S. patent application Ser. No. 16/875,504, the contents of which are incorporated herein by reference.

In a variant, the transparent adhesive label 10 can be generally described as including a transparent facestock; an adhesive layer on a surface of the transparent facestock; and a support liner releasably connected to the transparent facestock via the adhesive layer, the support liner being transparent, the support liner defining an ink receiving surface away from the transparent facestock. One or more slits is defined in the support liner to separate the support liner in at least two parts, with a first of the two parts being removable to expose the adhesive layer while a second of the two parts remains adhered to the transparent facestock so as to have data inscribed on the ink receiving surface.

The label 10 can be used for printing information and/or to secure and shield a sample to the surface of the object O, with or without printing on the label 10. Samples of different origins or types may be used with the label 10, such as plant, insect, tissue, biological, or microorganism or/and chemical sample collection and preservations. In some instances, there may be a use of a liquid, an oil, an epoxy or another preserving agent or solution used that may spread around and be captive under the label 10, and along with the sample, all in the volume or area under surface 13B of part 13C of the label 10, with the adhesive surrounding the part 13C acting as a barrier. As a variant, the preserving agent may be a formalin, or any aqueous concentration of formaldehyde, an alcohol based solution or any combination comprising a mixture of an alcohol and aqueous form aldehyde solution. The adhesive area A may create a seal around it. The preserving agent can remain liquid, gel, amorphous or solidify under the surface 13B. In some instances, additional sealing may be created around the label 10 by applying different sealing agents such as a nail polish or another sealing agent. Furthermore, in some instances where more anaerobe environment is necessary, the sample captured by the applied label 10 can be placed in a degassing chamber to remove any oxygen or gases. In such a case, a sealing agent may then be applied to ensure a better preservation.

Such an application is well suited for sample preservation since the sample does not come in contact with the adhesive 12 and yet it can be securely preserve under the surface 13B. Whenever it becomes necessary to recuperate the sample, the area around 13B can be cut (e.g., by a scalpel or a razor blade) and the sample can be recuperated for a further study or a use. The transparent nature of the label 10 may allow examination of the sample, for example visually, under magnifying glass, under microscope without the need to remove the sample from underneath the label surface 13B. In an embodiment, the label 10 can be applied to a microscope slide to provide a protection against physical or environmental damage. With the label 10 applied to a microscope slide, there is a possibility of having the sample collection on a transparent glass allowing better visibility of the sample from both top and bottom sides. In an embodiment, the microscope slide will be entirely positioned under the portion 13C of the label 10. As a variant, histological tissue samples after processing or fixation may be secured under the label 10 in a freezer or room temperature conditions.

The label 10 can be made from low temperature freezer grade or cryogenic grade plastic material and adhesive allowing the sample preservation in low and extra-low temperature conditions. In an embodiment the label 10 can withstand a storage at around −80C or below. In another embodiment the label 10 can withstand storage at around −120C or below. In yet another embodiment the label 10 can withstand a storage at around −196C or below. In yet another embodiment the label 10 can withstand a contact with liquid nitrogen and/or storage inside a vapour phase or liquid phase liquid nitrogen such as inside a Dewar cryogenic tank. In yet another embodiment the label 10 can withstand a storage in dry ice at around −78.5C. In yet another embodiment the label 10 can withstand a sterilization cycle using autoclave at 105C or above, ethylene oxide, dry heat at +150C or above, gamma irradiation at 0.5 KGy or above. The label 10 may also protect printing on the support liner 13 from fading result from UV exposure. For example, the facestock 11 may be made of acrylate or another UV protective transparent material to provide such UV shielding to the data printed on the support liner 13. The label 10 is particularly well suited to be used with vials that have light-tone color or opaque (e.g., white) background, or transparent vials with some writable opaque areas as such a background may contrast with the printing on the support liner 13 and may help to better visualize the printing.

An assembly of multiple labels or multi-label templates associated with each other through a facestock 11 is contemplated. Multiple columns of labels in the same roll or sheet is contemplated. Multiple rows of labels in the same roll or sheet is contemplated.

A double sided tape can be added in the zones of 13D which will allow to achieve a height difference between the zones 13B and 13D, such a height difference being well suited for a preservation of samples that have a thickness and require more space for their preservation. This may allow the selection of the height of edges of 13D by either using the adhesive of the double-sided tape or the adhesive 12 of the facestock 11.

While the label 10 has been described as being entirely transparent/translucent/hazy, it is considered to have the label 10 having only some transparent/translucent/hazy portion, which transparent/translucent/hazy portion in the facestock 11 would be aligned with the portion of the support liner 13 receiving the data thereon (the support liner 13 having for instance also a transparent/translucent/hazy portion). The transparent/translucent/hazy condition may be generally described as being see-through.

The label 10 of any of the figures described in the present disclosure can be used for facilities where the surface of the label 10 will be necessary to disinfect and clean such as equipment used in hospitals, bio-medical and pharmaceutical laboratories, food plants, veterinary clinics, animal facilities, in any other settings where the label may be exposed to physical impact, friction, rubbing, come in contact with a chemical(s), solvent(s), cleaning agent(s) (commercial or otherwise), disinfectant(s), oil, fuel, grease, detergent, gel, dirt, paint, ink, bodily fluid(s), water, snow, freezing, frost, soil, adverse environmental conditions. Due to the protective nature of the transparent facestock 11 the information printed on the support liner 13 may be strongly protected under the above mentioned conditions.

In a variant, the label 10 may be applied according to a method for using an adhesive label, which may include one or more of: removing part of a support liner adhered to a facestock having at least a see-through portion, to expose an adhesive on a first surface of the facestock, another part of the support liner being see-through having data thereon, the other part remaining connected to the first surface of the facestock via the adhesive; and applying the first surface of the facestock to a surface such that the facestock adheres to the surface by the adhesive exposed by the removing; whereby the data on the support liner is visible through the facestock. The method may further include one or more of: removing the part of the support liner includes removing the part entirely surrounding the other part; printing the data on the support liner may be performed prior to the removing; mirror-image printing; removing the facestock from another support liner, a second surface of the facestock adhered to the other support liner; removing the facestock from the other support liner including peeling the facestock from a static cling engagement with the other support liner; tearing a portion of the other support liner from a remainder of the other support liner via perforation lines in the other support liner; applying the label to a container for cryogenic storage at around −80C or below; applying the label to a surface that comes in contact with one of more of: chemical(s), solvent(s), cleaning agent(s), disinfectant(s), oil, grease, fuel, detergent, gel, dirt, paint, ink, bodily fluid(s), water, snow, freezing, frost, soil, adverse environmental conditions, liquefied gas; providing to an end user a container pre-labelled with the adhesive label after the applying; and/or exposing the adhesive label to any step of sterilization.

The invention claimed is:

1. An adhesive label extending in a longitudinal direction, comprising:
    a facestock having at least a see-through portion;
    an adhesive layer on a first surface of the facestock; and
    a support liner releasably connected to the facestock via the adhesive layer, the support liner having at least a see-through portion aligned with the see-through portion of the facestock, the see-through portion of the support liner defining an ink receiving surface facing away from the facestock;
    wherein two slits are defined in the support liner to separate the support liner in three parts parallel to one another, with a first of the three parts being removable to expose the adhesive layer while a second of the three parts remains adhered to the facestock so as to have data inscribed on the ink receiving surface.

2. The adhesive label according to claim 1, wherein the facestock is entirely transparent.

3. The adhesive label according to claim 1, wherein the support liner is entirely transparent.

4. The adhesive label according to claim 1, wherein the support liner includes a thermochromic ink system.

5. The adhesive label according to claim 1, further including a second support liner, a second surface of the facestock being releasably adhered to the second support liner.

6. The adhesive label according to claim 5, further including a static cling connection between the second support liner and the second surface of the facestock.

7. The adhesive label according to claim 5, wherein a plurality of the adhesive label are on the second support liner.

8. The adhesive label according to claim 5, wherein tear perforations are defined in the second support liner.

9. The adhesive label according to claim 5, wherein tear perforations are defined in the facestock and support liner to segment the facestock and support liner in at least two of the adhesive label.

10. The adhesive label according to claim 5, wherein printer sensor markers are provided on the second support liner.

11. The adhesive label according to claim 1, including mirror-image printing on the ink receiving surface of the support liner.

12. The adhesive label according to claim 1, wherein the first of the three parts entirely surrounds the second of the three parts, wherein the second of the three parts is surrounded by adhesive of the adhesive layer when the first of the three parts is removed.

13. The adhesive label according to claim 1, including a second support liner, a second surface of the facestock being releasably adhered to the second support liner.

14. The adhesive label according to claim 13, wherein printer sensor markers are provided on the second support liner.

15. The adhesive label according to claim 1, wherein printer sensor markers are provided on the support liner or on the facestock.

16. The adhesive label according to claim 1, wherein tear perforations are defined in the facestock to segment the facestock in at least two of the adhesive label, the tear perforations being transverse to the longitudinal direction.

17. The adhesive label according to claim 1, wherein printer sensor markers are provided on the support liner.

18. The adhesive label according to claim 1, wherein printer sensor markers are provided on the facestock.

* * * * *